(12) United States Patent
Koprivica (10) Patent No.: US 7,136,929 B2
(45) Date of Patent: Nov. 14, 2006

(54) BROADCAST IN A WIRELESS COMMUNICATIONS SYSTEM

(75) Inventor: Milosh Koprivica, Richmond (CA)

(73) Assignee: VTech Communications, Ltd., Tai Po (HK)

( * ) Notice: Subject to any disclaimer, the term of this patent is extended or adjusted under 35 U.S.C. 154(b) by 793 days.

(21) Appl. No.: 10/056,789

(22) Filed: Jan. 24, 2002

(65) Prior Publication Data

US 2003/0140298 A1    Jul. 24, 2003

(51) Int. Cl.
*G06F 15/16* (2006.01)
(52) U.S. Cl. .............. 709/232; 714/749; 714/750; 714/758; 370/34; 370/473
(58) Field of Classification Search ........... 709/225, 709/232; 714/746, 749, 548–550, 558; 704/758; 370/385, 473, 34; 380/34
See application file for complete search history.

(56) References Cited

U.S. PATENT DOCUMENTS

| | | | | |
|---|---|---|---|---|
| 4,644,468 A * | 2/1987 | Doster et al. | ............... | 709/220 |
| 5,216,675 A * | 6/1993 | Melliar-Smith et al. | .... | 714/748 |
| 5,243,595 A * | 9/1993 | Woest et al. | ................ | 370/469 |
| 5,583,866 A * | 12/1996 | Vook et al. | ................. | 370/312 |
| 5,594,726 A * | 1/1997 | Thompson et al. | ......... | 370/485 |
| 5,818,852 A * | 10/1998 | Kapoor | ....................... | 714/749 |
| 6,101,625 A * | 8/2000 | Higashi | ...................... | 714/776 |
| 6,161,123 A * | 12/2000 | Renouard et al. | ........... | 709/203 |
| 6,198,735 B1 * | 3/2001 | Pazhyannur et al. | ........ | 370/349 |
| 6,345,375 B1 * | 2/2002 | Kelkar et al. | ............... | 714/748 |
| 6,560,652 B1 * | 5/2003 | Larson et al. | ............... | 709/232 |
| 6,574,770 B1 * | 6/2003 | Daudelin | .................... | 714/776 |
| 6,615,383 B1 * | 9/2003 | Talluri et al. | ............... | 714/749 |

\* cited by examiner

*Primary Examiner*—Saleh Najjar
*Assistant Examiner*—Oanh Duong
(74) *Attorney, Agent, or Firm*—Paul, Hastings, Janofsky & Walker LLP (57) ABSTRACT

A reliable data communications protocol for the broadcast of long messages over a noisy medium, such as a frequency hopping communications link with multiple interferors. Long length messages are divided into a plurality of subpackets, each of which incorporates an error detection mechanism. A message integrity field is calculated based upon the contents of the subpackets, and is stored within one of the plurality of subpackets. The subpackets are transmitted two or more times. Each subpacket is stored by a recipient if received without error, and the recipient calculates a message integrity field based upon the stored subpackets. When the calculated message integrity field corresponds to the message integrity field received within the subpackets, the long message is deemed properly transmitted, reassembled from the plurality of subpackets, and processed appropriately.

13 Claims, 6 Drawing Sheets

BROADCAST IN A WIRELESS COMMUNICATIONS SYSTEM

BACKGROUND OF THE INVENTION

1. Field of the Invention

This invention relates in general to digital communications implemented using a frequency hopping spread spectrum technology. In particular, the invention relates to a technique for reliably transmitting long messages spanning multiple packets over a noisy frequency-hopped communications channel.

2. Background Art

As the prevalence and diversity of electronic devices incorporating digital communications techniques increases, it becomes important to implement versatile communications protocols that are well-suited to varied message contents and highly tolerant of noisy communications channels.

Frequency hopping spread spectrum ("FHSS") is an increasingly popular technique for implementing a digital communication link. FHSS involves the rapid alteration of a transmitted signal's carrier frequency in a known pattern, called the hop sequence. One advantage of a FHSS implementation is that interference sources occupying a portion of the communications channel do not completely disrupt the communication link; rather, only communications on hop sequence channels coinciding with an interference source are disrupted. Furthermore, in some circumstances, the carrier frequencies in the hop sequence can be dynamically allocated to eliminate frequencies at which interference is present, thus dynamically preserving a reliable communications link.

However, for some types of FHSS communications it is desirable to utilize a fixed hopping pattern. One example of this is for broadcast messaging to a plurality of remote receivers, such as that often employed by a cordless telephone system with multiple handsets and a single base unit. While the handsets are not "in use", they must be able to receive general messaging from the base unit to set up incoming calls, receive caller ID information, or perform other such functions. However, implementation of dynamic channel allocation with multiple receiving radios is often difficult because each channel substitution must be received and processed by every receiver without error. Also, handsets completing a call and returning to a standby state must become aware of changes in the broadcast hop sequence. Therefore, it is desirable to implement a fixed hop sequence for broadcast communications.

One substantial complication inherent to communications over a fixed hop sequence arises during the broadcast of long messages. Long messages are deemed those which contain an amount of data greater than that which can be transmitted during a single carrier frequency channel in the hop sequence. Thus, such messages are commonly broken up and transmitted via a plurality of data subpackets on different channels in the hop sequence. The message is then reconstructed and processed by the receiving device after all of the packets have been received. However, such messages are highly prone to errors inasmuch as an error in any one of the multiple transmitted packets will corrupt the entire message once it is reassembled by a receiving device.

The susceptibility of long messages to errors is further exacerbated by the use of a fixed hopping pattern. In circumstances when a large number of the channels in the hopping pattern are corrupted by interference, the hopping pattern may not even contain a number of consecutive "interference-free" channels sufficient to transmit an entire long message. Broadcast of long messages then becomes virtually impossible over such a highly noisy communications channel. Therefore, it is an object of this invention to enable the reliable communication of long messages over a noisy communications channel.

Even when channel noise does not completely prevent long message broadcast, the susceptibility of prior art fixed hopping pattern techniques to interference typically requires that a form of communications acknowledgement be implemented. An acknowledgement function would have the receiving handset(s) send back to the base some indication as to whether or not a long message was received without error. However, several disadvantages are inherent in the implementation of such an acknowledged communications protocol. The broadcasting device incurs added complexity to be able to also monitor one or more additional channels over which it would receive acknowledgement messaging from downlink recipients. Also, the downlink recipient devices over time consume substantial power by powering up their respective transmitters just to transmit an acknowledgement. In applications such as cordless telephones, where the broadcast recipients attempt to minimize power consumption due to limited battery capacity, the power consumption required to regularly transmit acknowledgements can comprise a substantial disadvantage. Therefore according to another aspect of this invention, a reliable long message broadcast protocol is provided that is also unacknowledged.

These and other objects of the present invention will become apparent to those of ordinary skill in the art in light of the present specifications, drawings and claims.

SUMMARY OF THE INVENTION

The invention provides for reliable and unacknowledged communication of variable length long messages in the presence of interference on the communications channel. The long message is divided up into a plurality of subpackets of predetermined size. For frequency-hopping communications systems, each subpacket is of a size that can be transmitted on a single channel in the hop sequence. Each subpacket further includes an error detection mechanism, such as a cyclic redundancy check, such that message recipients can determine if the individual subpacket has been received without error. Finally, an additional message integrity field error checking mechanism is calculated and incorporated into one of the plurality of subpackets. The message integrity field is indicative of the contents of all of the subpackets, thereby providing an indication whether all of the plurality of subpackets have been correctly received.

Each subpacket is transmitted over the communications link multiple times. A transmission recipient stores each subpacket if the subpacket's error detection mechanism indicates that it has been received without errors. The recipient then calculates a message integrity field value based upon the stored subpackets. If the message integrity field calculated by the recipient corresponds to the message integrity field embedded within a packet received by the recipient, then the recipient deems the entire message to have been properly received. The recipient then reassembles the subpackets into the original message, and processes it appropriately.

DETAILED DESCRIPTION OF THE DRAWINGS

While this invention is susceptible to embodiment in many different forms, there are shown in the drawings and will be described in detail herein several specific embodiments. The present disclosure is to be considered as an exemplification of the principle of the invention intended merely to explain and illustrate the invention, and is not intended to limit the invention in any way to embodiments illustrated.

Figure 1:
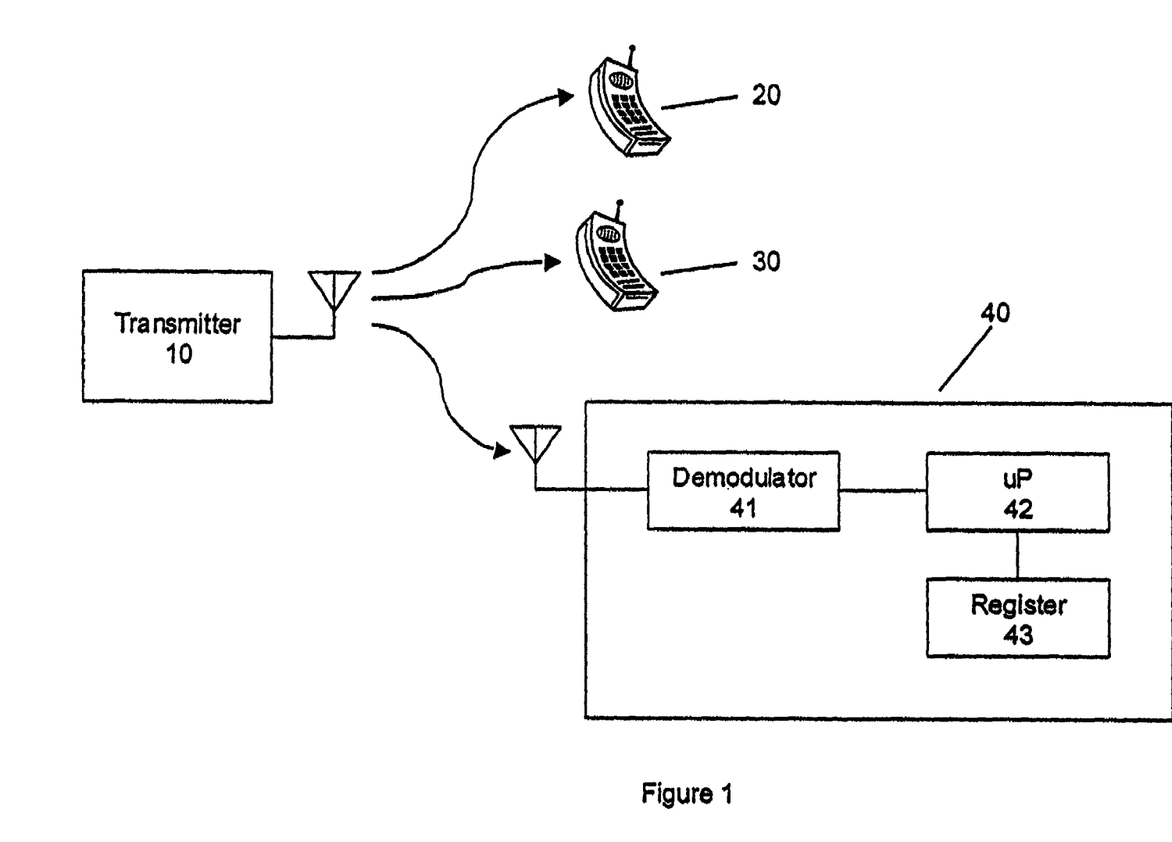
FIG. 1 is a block diagram of a wireless base station broadcasting long message data to a plurality of recipients via a wireless communications link.

FIG. 1 depicts a scenario in which the present invention might be employed. Transmitter 10 is a portion of a wireless telephone base station, which is operatively connected to a public telecommunications network (not shown). Handsets 20, 30 and 40 communicate with transmitter 10 via a frequency hopping communications link while employing a fixed hopping pattern. Handsets 20, 30 and 40 are of the type which enter a low-power standby mode, when they are not in active use. In such a mode they monitor broadcast messaging from transmitter 10. Such messaging often consists of long messages, which contain too much data to be communicated during the course of one frequency hop.

Figure 2:
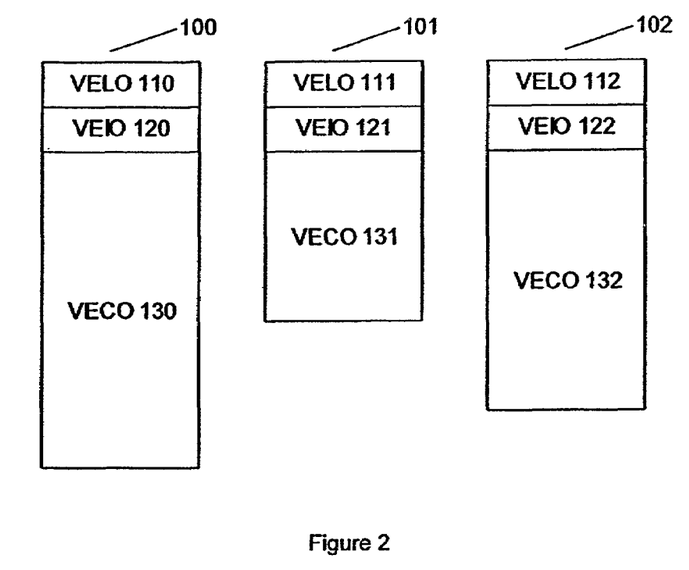
FIG. 2 is a depiction of variable length long broadcast messages.

FIG. 2 depicts a plurality of long messages taking the form of Variable Length Packets ("VLPs") 100, 101, and 102. The VLPs each include message length fields 110, 111, and 112, respectively. The VLPs also respectively include fields 120, 121, and 122 to indicate the type of data included in the VLPs, and data fields 130, 131 and 132, themselves, each of varying length. Each of VLPs 100, 101 and 102 contain a quantity of data that is greater than that which can be transmitted within a single packet of the communications protocol that is to be used to transmit the messages.

Figure 3:
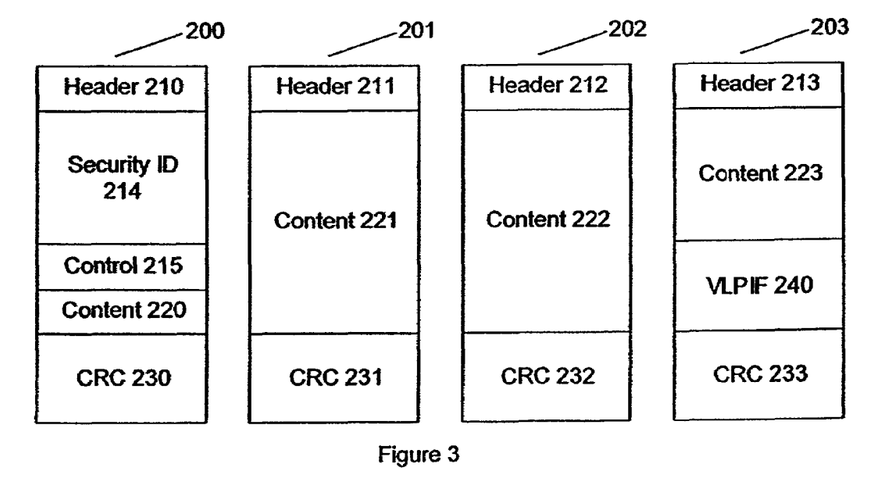
FIG. 3 depicts multiple data subpackets that are transmitted to convey a single long broadcast message.

VLP 100 is broken up and transmitted via subpackets 200, 201, 202 and 203, consecutively, shown in FIG. 3. Subpackets 200–203 include headers 210–213 and error detection fields based on cyclic redundancy checks ("CRCs") 230–233, respectively. Each subpacket's header indicates the sequential order of that subpacket within VLP 100; if desired, the header may also comprise sequence numbers for the sliding window technique as implemented by prior art wireless communications protocols such as CT-2. Error detection fields 230–233 can be computed according to techniques known in the art, such as CRC (e.g. CRC-16, CRC-CCITT, etc.), block sum check (i.e. checksum), or parity. Moreover, error detection field calculations other than CRCs, checksum and parity can be used, to the extent that they also provide a mechanism by which a receiving device can determine whether it has received the subpacket with which it is associated without errors.

Subpacket 200 also includes security ID code 214 and control data 215. Security ID 214 uniquely identifies the base unit, and is known to all handsets registered for communication with the base. Thus, security ID 214 provides a mechanism which ensures that only handsets comprising the intended communication system can receive the VLP.

Packets 200, 201, 202 and 203 include content fields 220, 221, 222, and 223, respectively. Content fields 220–223 collectively contain the data of VLP 100, broken up into sequential segments of size whereby each segment can be transmitted in the course of one frequency hop. In some instances, a transmitted VLP may be short in length, such that the added overhead of the long message broadcast, including the subpacket headers, security ID, control field, and VLPIF, becomes a substantial portion of the data transmitted. In such cases, it may be desirable to improve transmission efficiency by concatenating multiple short VLPs into a single long message, so long as the combined VLPs can be broken into a number of subpackets that can be fully contained within memory register 43.

Subpacket 203 includes Variable Length Packet Integrity Field ("VLPIF") 240. VLPIF 240 is utilized by the communication recipient to determine whether all of the subpackets comprising a long message VLP have been received without error. Thus, the VLPIF contains compressed information about all of the subpackets associated with the VLP. For example, in one embodiment, the VLPIF could be determined by performing a CRC or checksum calculation on the concatenated error detection fields (i.e. CRCs) of all subpackets within the VLP other than that in which the VLPIF is stored. In another embodiment, the VLPIF could be determined by performing a CRC or checksum calculation based upon all data within the VLP subpackets, other than that in which the VLPIF is stored.

The specific calculation employed to determine the VLPIF may depend upon the particular characteristics and goals of the implementation. When the subpacket CRC calculation technique is strong enough to detect most any errors within a single subpacket, it may be sufficient to employ a simple VLPIF calculation based only upon those subpacket CRCs, such as a two octet wide checksum.

However, calculating the VLPIF based upon only the subpacket CRCs may not be effective in some systems, such as those where header information, and therefore subpacket CRCs, change between redundant retransmissions of a specific subpacket. For example, some cordless telephones employ flow control techniques such as the Sliding Windows technique, where the intended order of data processing is ensured by sequentially identifying each transmitted packet in a header field. Because separately transmitted packets may have differing flow control fields, and therefore different error detection fields, even when they convey identical data content, the VLPIF in such a system may be determined as a CRC or checksum based upon, for example, only Security ID 214, Control 215, and content fields 220–223, such that changes in the subpacket headers during retransmission of a long message do not affect the VLPIF.

System implementation details may also impact the selection of an optimal VLPIF calculation when certain IC communications chipsets are used in the design. Many chipsets include hardware circuits for automatically calculating and appending subpacket CRCs just prior to transmission, and checking subpacket CRCs upon receipt. Moreover, such hardware circuits often do not make the values of such CRC calculations accessible to outside circuitry, instead providing only an indication as to whether each subpacket is properly received. Thus, the VLPIF cannot be calculated based upon actual subpacket CRC values; instead, it must be determined as a CRC or checksum based upon, for example, the contents of Security ID 214, Control 215, and content fields 220–223.

Figure 4:
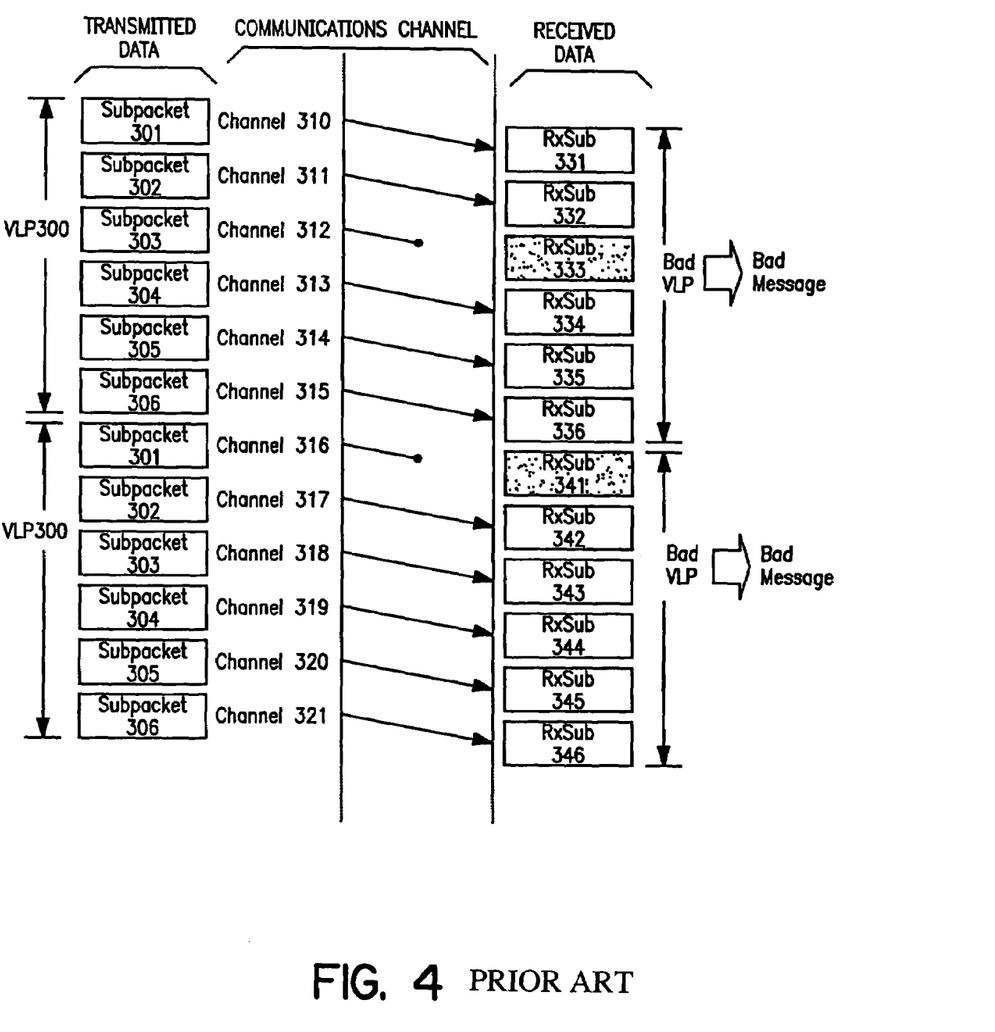
FIG. 4 is a diagram depicting the unsuccessful attempted transmission of a long broadcast message over a communications channel subject to interference, according to prior art transmission techniques.

FIG. 4 illustrates the attempted transmission of a long message over a noisy channel according to a typical prior art wireless communications technique. VLP 300 is subdivided into subpackets 301, 302, 303, 304, 305 and 306. The VLP is transmitted via a frequency hopping spread spectrum ("FHSS") communications link, with each subpacket being transmitted on a different channel in a fixed hop sequence. The hop sequence includes channels 310 through 321, of which channels 312 and 316 are illustrated to be sufficiently noisy such that errors occur in data communicated thereon. Under the prior art long message broadcast technique, subpackets 301 through 306 are broadcast sequentially on frequency channels 310 through 315, respectively. The broadcast recipient receives RX subpackets 331 through 336. However, in the example illustrated, channel 312 is noisy, such that transmitted subpacket 303 will be received with errors as RX subpacket 333. Thus, the broadcast recipient cannot assemble RX subpackets 331 through 336 into an error-free VLP, and the broadcast communication fails.

According to prior art techniques, the broadcasting device may attempt to resend the VLP. However, in highly noisy environments, a sufficient number of consecutive, error-free frequency channels in a FHSS hop sequence may be rare or even nonexistent, in which case the VLP simply cannot be correctly communicated. For example, FIG. 4 illustrates a second attempt to transmit subpackets 301 through 306 via frequency channels 316 through 321, respectively. However, channel 316 is noisy, and subpacket 301 is received with errors as RX subpacket 341. This attempted broadcast communication also fails because broadcast recipients again cannot assemble RX subpackets 341 through 346 into an error-free VLP.

Figure 5:
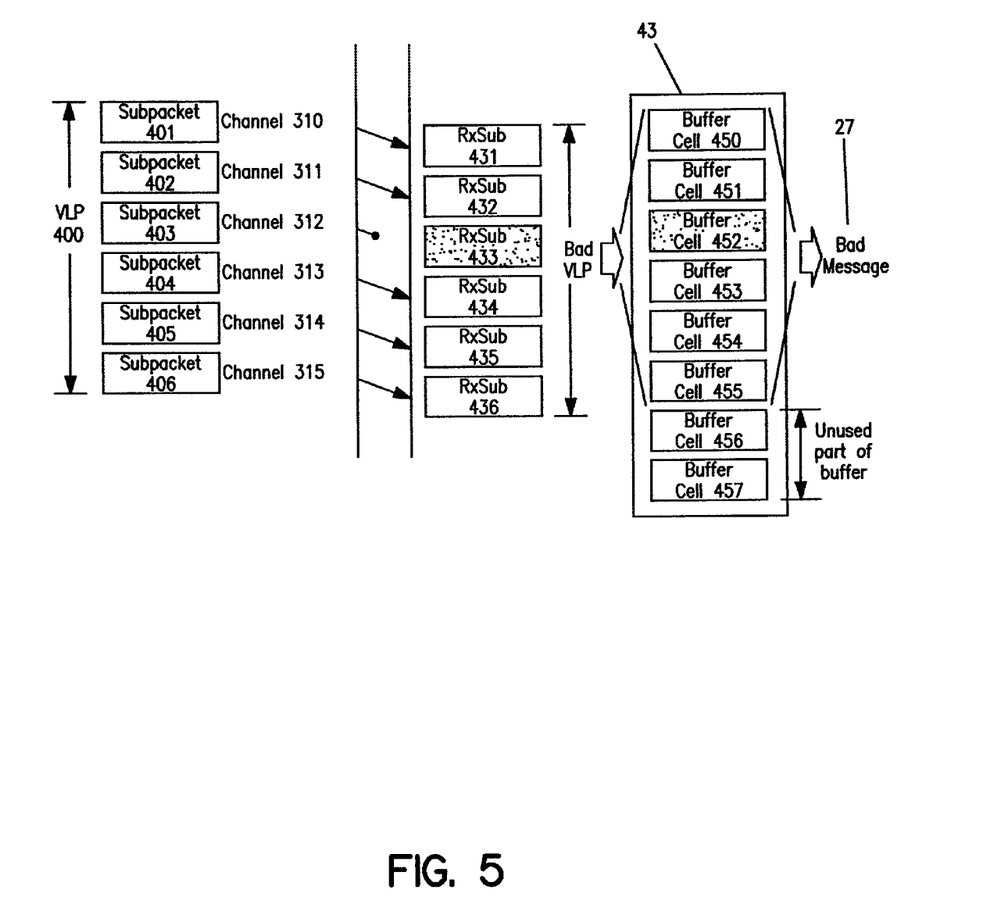
FIG. 5 is a diagram depicting a first transmission of a long broadcast message over a noisy communications channel, according to the current invention.
Figure 6:
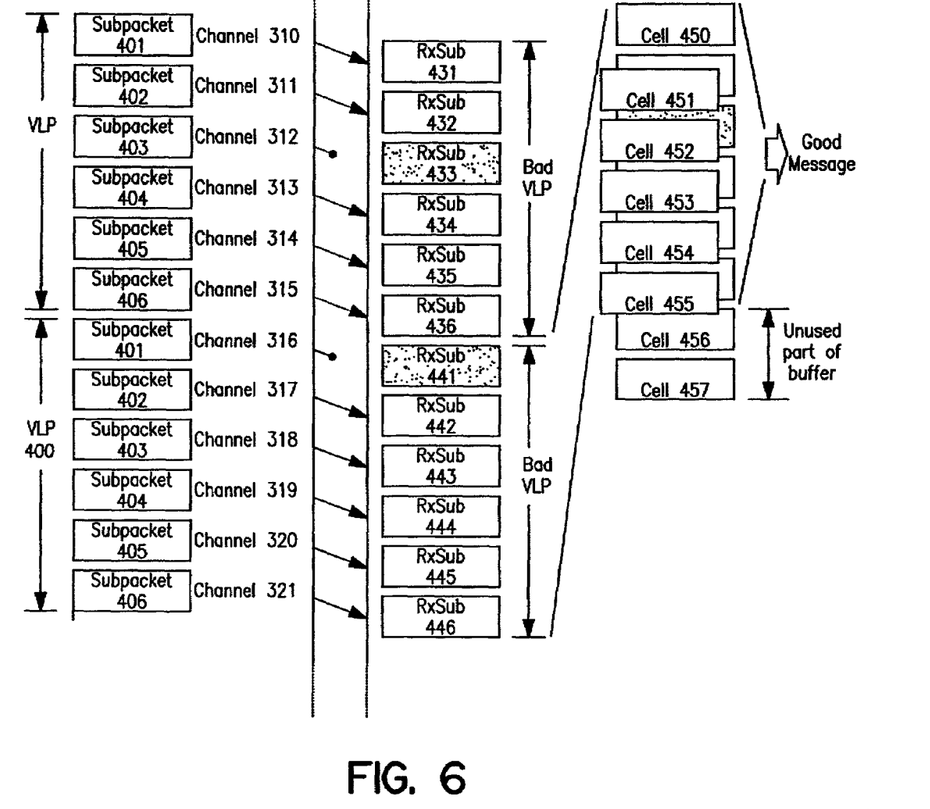
FIG. 6 is a diagram depicting a second transmission of the long broadcast message over the communications channel and its successful receipt, according to the current invention.

FIGS. 5 and 6 illustrate how a VLP can be successfully transmitted over frequency channels 310–321 by using the technique taught by the present invention in the context of the cordless telephone system with multiple handsets, of FIG. 1. In FIG. 5, VLP 400 is comprised of subpackets 401 through 406, which are transmitted by transmitter 10 on frequency channels 310 through 315, respectively. The subpackets are received by broadcast recipient 40 as RX subpackets 431–436.

After each RX subpacket is received and demodulated by demodulator 41, microprocessor 42 evaluates the CRC of that subpacket. If a subpacket's CRC evaluation indicates that the subpacket was correctly received, the subpacket data is written into memory register 43. Register 43 is comprised of a number of cells corresponding to the maximum number of subpackets in a long message. In the embodiment illustrated, register 43 is comprised of cells 450 through 457. After a subpacket is written into a cell of register 43, microprocessor 42 calculates a VLPIF for the data stored in register 43, if a VLPIF value has already been received in a transmitted subpacket. If the received VLPIF correctly corresponds to the value calculated for the data in register 43, then recipient 40 deems the VLP to be complete, and the long message content is further processed by recipient 40.

In FIG. 5, RX subpackets 431, 432, 434 and 435 are shown received without errors on channels 310, 311, 313 and 314, respectively. Therefore, each of these subpackets are written into register 43; specifically, RX subpacket 431 is stored in cell 450, RX subpacket 432 is stored in cell 451, RX subpacket 434 is stored in cell 453, RX subpacket 435 is stored in cell 454, and RX subpacket 436 is stored in cell 455. Because the particular VLP illustrated in FIG. 5 requires only six of the maximum eight possible subpackets, cells 456 and 457 remain unused.

Because subpacket 403 is transmitted on noisy frequency channel 312, it is received with an error as RX subpacket 433. The recipient determines that the data in RX subpacket 433 does not correspond to its CRC, and thus RX subpacket 433 is not written into register cell 452. Therefore, when microprocessor 42 performs the VLPIF calculation on the data in register 43, the result does not correspond to the proper VLPIF value received in the last subpacket of the VLP, stored in buffer cell 455. The VLP is not complete, and is not processed.

Similarly to the prior art technique illustrated in FIG. 4, VLP 400 is broadcast multiple times to increase the likelihood of a successful transmission. Accordingly, FIG. 6 illustrates the operation of the present invention during a second broadcast of VLP 400, on subsequent frequency channels 316 through 321. Subpacket 401 is broadcast via channel 316. Because channel 316 is bad, the subpacket is received with one or more errors as RX subpacket 441. Because RX subpacket 441 has errors, it is not stored in register cell 450. However, cell 450 already contains error-free subpacket 401 data from the prior receipt of RX subpacket 431. RX subpackets 442 through 446 are properly received over frequency channels 317 through 321, respectively.

After the storage of RX subpacket 443 into cell 452, the VLPIF calculation performed on register 43 properly corresponds to the VLPIF value received and stored in cell 455, thereby indicating that the VLP was received correctly, such that the long message data can be processed. According to the present technique, VLP 400 is received without errors, despite the fact that each VLP transmission individually contained subpackets with errors. By implementing a predetermined number of transmissions for each VLP, a highly robust broadcast communications link is attained without requiring retransmission requests or other recipient feedback.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

Figure 7:
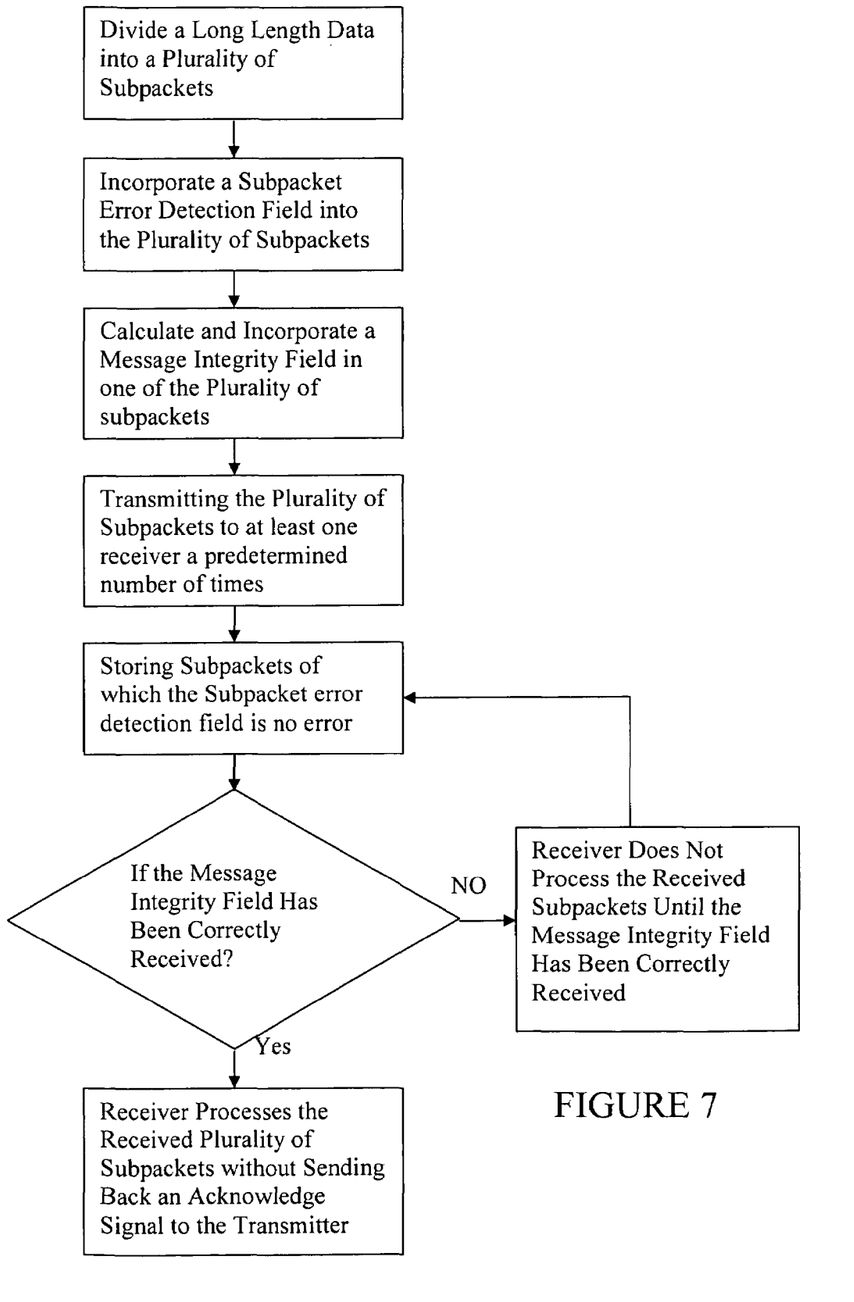
FIG. 7 is a flow chart illustrating a method for reliable unacknowledged communication of long data messages in accordance with the present invention.

FIG. 7 is a flow chart showing a method for reliable unacknowledged communication of long length data messages in accordance with the present invention. The description of this drawing is consistent with those of FIGS. 5 and 6 mentioned above.

I claim:

1. A method for reliable unacknowledged communication of a long length data message transmitted in a presence of interference, the method comprising the steps of:
    dividing contents of the long length data message into a plurality of subpackets of predetermined size;
    incorporating a subpacket error detection field into each of the plurality of subpackets;
    calculating a value of a message integrity field indicative of the contents of the long length data message;
    incorporating the value of the message integrity field into one of the plurality of subpackets;

transmitting the plurality of subpackets and the value of the message integrity field to at least one receiver over a communications link for a predetermined number of times;

storing at least one of the plurality of subpackets by the at least one receiver when the subpacket error detection field of the at least one of the plurality of subpackets received by the at least one receiver indicates that the at least one of the plurality of subpackets has been received without error;

calculating a message integrity field value of the stored at least one of the plurality of subpackets; and determining that the long length data message has been correctly received when the message integrity field value of the stored at least one of the plurality of subpackets corresponds to the transmitted value of the message integrity field, wherein said transmitting the plurality of subpackets and the value of the message integrity field to at least one receiver over a communication link for the predetermined number of times is implemented to provide a highly robust broadcast communication link without requiring the at least one receiver to send back an acknowledge signal when the long length data is determined to be received correctly.

2. The method of claim 1, where the subpacket error detection field is comprised of a cyclical redundancy check based upon the subpacket contents.

3. The method of claim 1, in which the message integrity field is calculated based upon the entirety of the contents of the subpackets.

4. The method of claim 1, in which the message integrity field is calculated based upon the contents of the long length data message.

5. The method of claim 1, in which the message integrity field is calculated based upon the subpacket error detection fields.

6. The method of claim 1, in which the message integrity field is calculated based upon the contents of each subpacket other than the subpacket in which the message integrity field is stored.

7. The method of claim 1, in which the message integrity field is stored within at least one of the plurality of subpackets.

8. The method of claim 1, in which the message integrity field is stored within one of the plurality of subpackets, and the message integrity field is calculated based upon the subpacket error detection field.

9. The method of claim 1, where the communications link is based on a frequency hopping protocol, and subpackets are transmitted on different carrier frequencies.

10. A frequency hopping communications system for reliably broadcasting a long length data packet in a presence of interference sources, the system comprising:

a plurality of subpackets into which contents of the long length data packet are divided, each of the plurality of subpackets includes an error detection field for evaluating an accuracy of said each of the plurality of subpackets when transmitted;

a message integrity field being included in at least one of the plurality of subpackets, said message integrity field is calculated to include compressed information describing data contained within the plurality of subpackets;

a transmitter for broadcasting said each of the plurality of subpackets for a predetermined number of times;

at least one receiver for receiving and modulating said each of the plurality of subpackets;

a memory register associated with the at least one receiver for storing at least one of the plurality of subpackets when the error detection field of the at least one of the plurality of subpackets indicates that the at least one of the plurality of subpackets has been accurately received;

a packet completion evaluator for calculating a message integrity value of the stored at least one of the plurality of subpackets based upon contents of the memory register, and determining that the long length data packet has been correctly received when a result of the calculating a message integrity value of the stored at least one of the plurality of subpackets matches the message integrity field received in the transmitted plurality of subpackets;

when the long length data packet is determined to be correctly received, the data within the correctly received long length data packet is subsequently processed by the at least one receiver without sending an acknowledge signal back to the transmitter, wherein said broadcasting said each of the plurality of subpackets for the predetermined number of times is implemented to provide a highly robust broadcast communication link without requiring the at least one receiver to send feed back when the long length data packet is determined to be received correctly.

11. The system of claim 10, in which the message integrity field is calculated based upon the content of the long length data packet.

12. The system of claim 10, in which the message integrity field is calculated based upon the error detection fields of the subpackets other than the subpacket in which the message integrity field is included.

13. The system of claim 10, wherein the transmitter broadcasts the subpackets in accordance with a frequency hopping protocol.

* * * * *